UNITED STATES PATENT OFFICE.

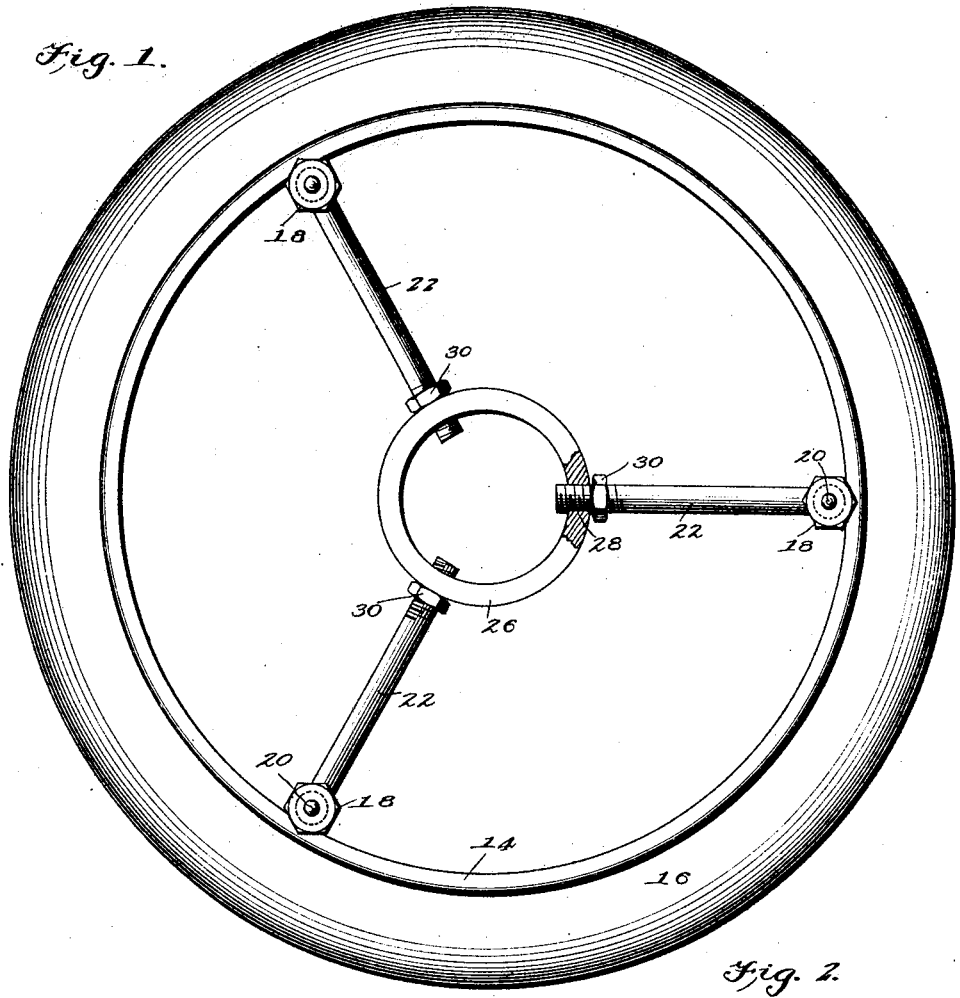
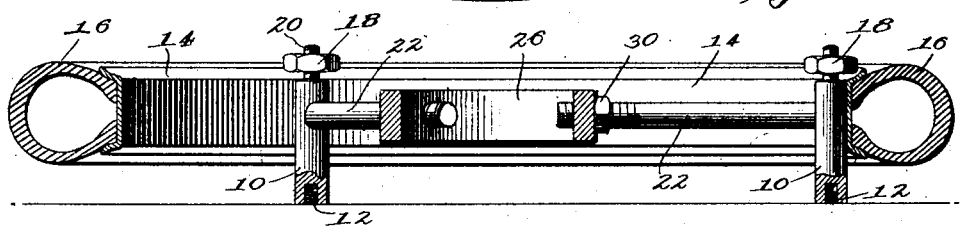
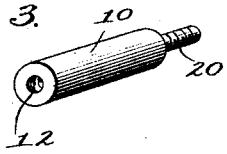

HENRY OLRY SOLLEE, OF LOS ANGELES, CALIFORNIA.

TIRE CARRIER.

1,412,425. Specification of Letters Patent. Patented Apr. 11, 1922.

Application filed October 20, 1920. Serial No. 418,140.

*To all whom it may concern:*

Be it known that I, HENRY O. SOLLEE, a citizen of the United States, and a resident of Los Angeles, in the county of Los Angeles and State of California, have invented certain new and useful Improvements in Tire Carriers, of which the following is a specification.

This invention relates to tire carriers especially adapted for application to motor vehicles.

An important object of this invention is to provide a tire carrier having simple means whereby the same may be readily and conveniently adjusted for use in supporting tires of various sizes.

A further object of the invention is to provide a tire carrier for motor vehicles which may be applied to the vehicle either while the same is being assembled originally or at any time thereafter without necessitating elaborate alterations in the structure of the vehicle.

The invention forming the subject matter of this application aims also to provide a tire carrier for motor vehicles which is of highly simplified construction, neat in appearance and cheap to manufacture.

Other objects and advantages of the invention will be apparent during the course of the following description.

In the accompanying drawing forming a part of this application and in which like numerals are employed to designate like parts throughout the same, Figure 1 is a plan view of the improved tire carrier having a tire and a rim mounted thereon, Figure 2 is a central sectional view through the improved tire carrier, a tire being shown mounted thereon, and Figure 3 is a perspective of a tire supporting arm embodied in the invention.

In the drawing wherein for the purpose of illustration is shown a preferred embodiment of the invention, the numerals 10 designate a plurality of arms of cylindrical formation which have one end portion formed with interiorly screw-threaded sockets 12 adapted for the reception of securing means such as stud bolts. The bolts which are adapted to thread into the sockets 12 are carried by any convenient portion of the vehicle. For example it may be desired to arrange the tire carrier at the rear end of the vehicle and in that case, the stud bolts which thread into the sockets may be mounted on the rear side of the vehicle so as to permit the attaching arms to be properly mounted.

As illustrated in Figure 2, the cylindrical attaching arms 10 are arranged in spaced relation and are engaged by a rim 14 which carries a pneumatic tire 16. The rim 14 is, of course, slipped over the outer sides of the spaced attaching arms 10 and is held in that position by means of nuts 18 which have threaded engagement with reduced shanks 20 formed at the ends of the attaching arms. As the nuts are threaded onto the reduced portions 20 of the cylindrical attaching arms the rims are drawn into position on the attaching arms.

The stud bolts or other fastening means which are adapted to thread into the sockets 12 are not strong enough to securely support the rim and the tire since the arms 10 are subject to considerable vibration and strain incident to the travel of the vehicle. To provide a means whereby the attaching arms 10 may withstand the strain incident to supporting the tire and the rim, I have connected a plurality of radially arranged bracing rods 22 to the same. As illustrated in Figure 2, the outer end portions of the bracing rods 22 extend into the outer portions of the arms 10 and are arranged at right angles to same. The inner portions of the radially arranged bracing rods 22 are extended through a hub 26 in the form of an annulus. The radial openings 28 through which the threaded inner end portions of the bracing rods 22 are extended are smooth so that the bracing rods may partake of longitudinal movement with relation to the annulus. Adjusting nuts 30 are threaded onto the bracing rods 22 and bear against the outer side of the annulus so that the rods 22 and consequently the attaching arms 10 may be adjusted with relation to the annulus. That is to say, by threading or rotating the nuts 30 in the direction of the inner end of the bracing rod, the bracing rod will be moved outwardly thereby moving the corresponding attaching arm outwardly. In that case, however, more than one series of fastening elements may be provided for connecting the arms 10 to the vehicle.

In applying the improved tire carrier, the cylindrical attaching device 10 is connected to suitable securing means carried by the body and which are adapted to be threaded into the sockets 12. The bracing rods 22 are, of course, attached prior to securing the tire on the arms 10 by means of the nuts 18. Should the arms 10 become weakened in their connection with the vehicle, the same may be moved outwardly to a limited degree by means of the spaced rods 22 which are capable of longitudinal movement with relation to the hub 26.

With reference to the foregoing description it will be observed that a tire carrier constructed in accordance with this invention can be easily attached to any vehicle without materially altering the construction of the same. The device when applied does not detract from the appearance of the vehicle and by reason of the simplicity of its construction may be manufactured at an extremely low cost.

Attention is directed to the fact that when the bracing rods 22 are moved outwardly by the adjustment of the nuts 30, the rim supporting arms 10 will be moved outwardly and caused to assume slightly inclined positions for holding the rim against displacement.

Having thus described the invention, what I claim is:

A tire carrier comprising a plurality of separate rim supporting arms having means whereby the same may be independently attached to a motor vehicle, radially arranged bracing rods extending into the sides of said rim supporting arms intermediate the ends of the same, an annular hub having openings receiving the inner terminal portions of said rods, adjusting nuts threaded on said bracing rods and contacting with the outer sides of said hub, and rim retaining nuts threaded on the outer ends of said separate and independent arms, said adjusting nut constituting a means whereby the outer portions of said separate arms may be forced into engagement with a rim whereby to hold the rim on the arms.

HENRY OLRY SOLLEE.